(12) United States Patent
Onodera et al.

(10) Patent No.: US 10,707,020 B2
(45) Date of Patent: Jul. 7, 2020

(54) ELECTRONIC COMPONENT

(71) Applicant: TDK CORPORATION, Tokyo (JP)

(72) Inventors: Shinya Onodera, Tokyo (JP); Koki Ito, Tokyo (JP); Hideki Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/918,188

(22) Filed: Mar. 12, 2018

(65) Prior Publication Data

US 2018/0268998 A1 Sep. 20, 2018

(30) Foreign Application Priority Data

Mar. 16, 2017 (JP) .................. 2017-051590

(51) Int. Cl.
| | |
|---|---|
| *H01G 4/30* | (2006.01) |
| *H01G 4/248* | (2006.01) |
| *H01G 4/232* | (2006.01) |
| *H01G 4/012* | (2006.01) |
| *H01G 4/12* | (2006.01) |
| *H01G 4/008* | (2006.01) |

(52) U.S. Cl.
CPC ........... *H01G 4/2325* (2013.01); *H01G 4/232* (2013.01); *H01G 4/248* (2013.01); *H01G 4/30* (2013.01); *H01G 4/0085* (2013.01); *H01G 4/012* (2013.01); *H01G 4/1227* (2013.01); *H01G 4/1245* (2013.01)

(58) Field of Classification Search
CPC ........ H01G 4/30; H01G 4/232; H01G 4/2325; H01G 4/248
USPC ............ 361/301.4, 306.3, 321.2, 303, 306.1, 361/321.1, 321.3
See application file for complete search history.

(56) References Cited

U.S. PATENT DOCUMENTS

| | | | | |
|---|---|---|---|---|
| 2009/0040688 | A1* | 2/2009 | Kayatani | ............. H01G 4/2325 361/321.1 |
| 2015/0162132 | A1* | 6/2015 | Kwag | ...................... H01G 4/30 174/260 |
| 2017/0154729 | A1* | 6/2017 | Lee | ........................ H01G 4/012 |

FOREIGN PATENT DOCUMENTS

| | | |
|---|---|---|
| JP | H08-107038 A | 4/1996 |
| JP | 2003-197460 A | 7/2003 |

* cited by examiner

*Primary Examiner* — Arun Ramaswamy
(74) *Attorney, Agent, or Firm* — Oliff PLC

(57) ABSTRACT

An electronic component includes an element body and an external electrode disposed on the element body. The external electrode includes a sintered metal layer and a conductive resin layer. The conductive resin layer is formed over the sintered metal layer and the element body. An average thickness of the conductive resin layer is smaller than that of the sintered metal layer.

8 Claims, 13 Drawing Sheets

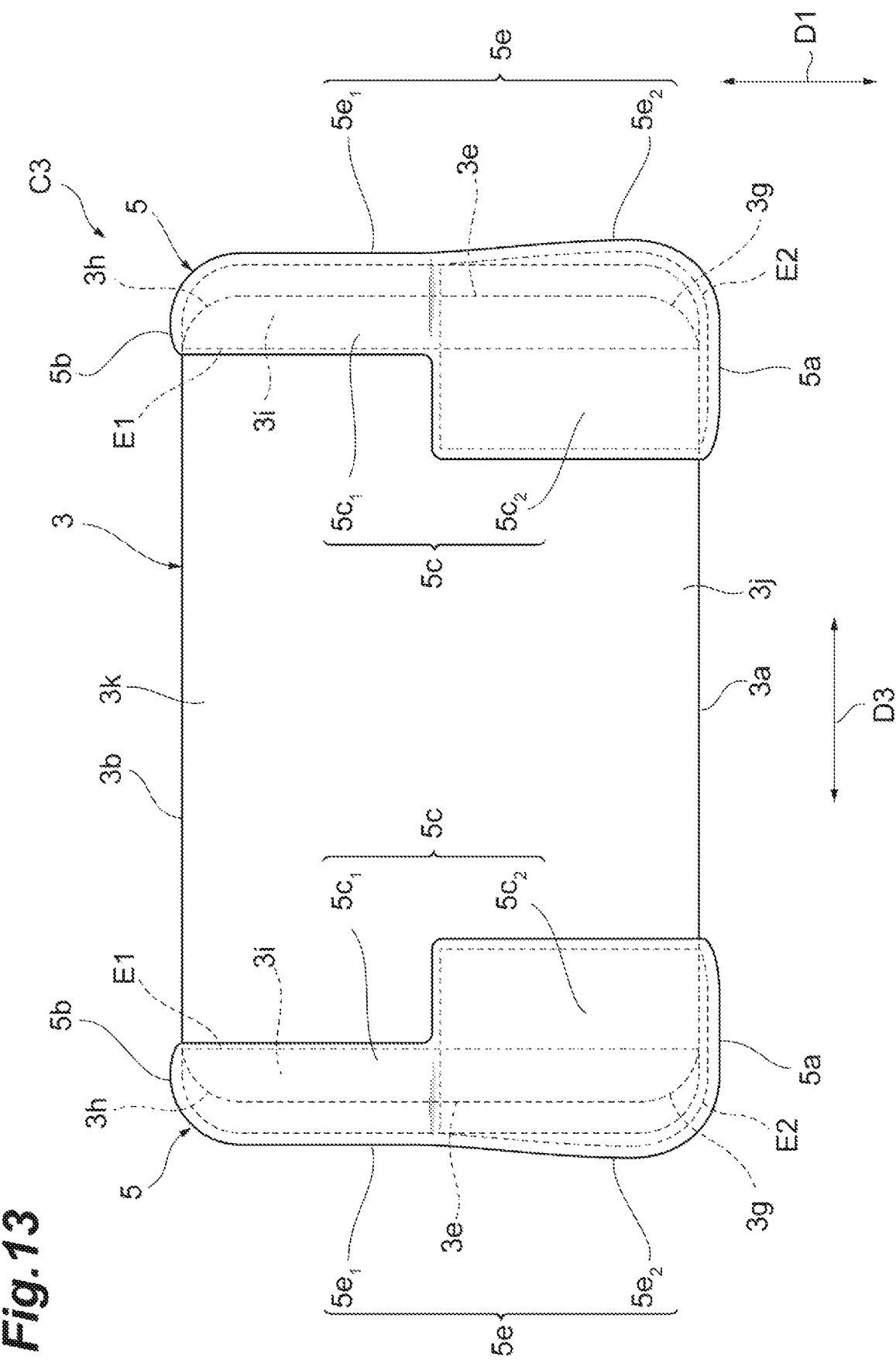

ELECTRONIC COMPONENT

BACKGROUND OF THE INVENTION

1. Field of the Invention

The present invention relates to an electronic component.

2. Description of Related Art

Known electronic components include an element body of a rectangular parallelepiped shape and a plurality of external electrodes (see, for example, Japanese Unexamined Patent Publication No. H8-107038). The element body includes a pair of end surfaces opposing each other. The plurality of external electrodes is disposed at each end portion of the element body in a direction in which the pair of end surfaces opposes each other. The external electrode includes a sintered metal layer and a conductive resin layer. The conductive resin layer is formed on the sintered metal layer.

SUMMARY OF THE INVENTION

An object of one aspect of the present invention is to provide an electronic component that suppresses occurrence of a crack in an element body and suppresses an increase in equivalent series resistance (ESR).

An electronic component according to one aspect of the present invention includes an element body of a rectangular parallelepiped shape and a plurality of external electrodes. The element body includes a pair of end surfaces opposing each other. The plurality of external electrodes is disposed at both end portions of the element body in a direction in which the pair of end surfaces opposes each other. The plurality of external electrodes includes a sintered metal layer and a conductive resin layer. The conductive resin layer is formed over the sintered metal layer and the element body. An average thickness of the conductive resin layer is smaller than an average thickness of the sintered metal layer.

In the electronic component disclosed in Japanese Unexamined Patent Publication No. H8-107038, the thickness of a conductive resin layer is not taken into consideration. It is generally understood that the more the thickness of the conductive resin layer increases, the more an effect of suppressing occurrence of a crack increases. In contrast, according to new findings of the present inventors, a configuration in which the conductive resin layer is formed over the sintered metal layer and the element body suppresses the occurrence of a crack in the element body even in a case where the average thickness of the conductive resin layer is smaller than the average thickness of the sintered metal layer.

The conductive resin layer includes a conductive material and a resin. The conductive material includes, for example, metal powder. The resin includes, for example, a thermosetting resin. Electric resistance of the conductive resin layer is larger than electric resistance of the sintered metal layer. The more the thickness of the conductive resin layer increases, the more the electric resistance of the conductive resin layer increases. In the one aspect, the average thickness of the conductive resin layer is smaller than the average thickness of the sintered metal layer. Therefore, the one aspect suppresses an increase in the ESR, as compared with a configuration in which the average thickness of the conductive resin layer is equal to or more than that of the sintered metal layer.

In the one aspect, the external electrode may include a first electrode portion disposed on the end surface. An average thickness of the conductive resin layer included in the first electrode portion may be smaller than an average thickness of the sintered metal layer included in the first electrode portion. When the electronic component includes an internal conductor disposed in the element body, generally, an end of the internal conductor is exposed at the end surface of the element body. The end of the internal conductor is directly connected to the external electrode. Therefore, the first electrode portion disposed on the end surface exerts large influence on the ESR. A configuration in which the average thickness of the conductive resin layer included in the first electrode portion is smaller than the average thickness of the sintered metal layer included in the first electrode portion surely suppresses the increase in the ESR.

In the one aspect, the element body may include a principal surface adjacent to the pair of end surfaces and arranged to constitute a mounting surface. The first electrode portion may include a first region, and a second region located closer to the principal surface than the first region. In the first region, the sintered metal layer is exposed from the conductive resin layer. In the second region, the sintered metal layer is covered with the conductive resin layer.

As a result of the research and study conducted by the present inventors, the following new facts has been discovered. When the electronic component is solder-mounted on an electronic device, external force applied onto the electronic component from the electronic device may act as stress on the element body. The electronic device is, for example, a circuit board or an electronic component. The external force is applied onto the element body from a solder fillet formed at the solder-mounting, through the external electrode. The stress tends to concentrate on an end edge of the external electrode. For example, the stress tends to concentrate, within the external electrode, on the end edge located near to the principal surface. Therefore, a crack may occur in the element body with the end edge of the external electrode serving as an origination.

In this configuration, the second region of the first electrode portion disposed on the end surface includes the conductive resin layer. Therefore, the stress tends not to concentrate on the end edge of the external electrode even in the case where the external electrode includes the first electrode portion. Consequently, this configuration surely suppresses the occurrence of a crack in the element body.

In this configuration, the sintered metal layer is exposed from the conductive resin layer in the first region of the first electrode portion. The first region does not include the conductive resin layer. In the first region, an electrical connection between the sintered metal layer and the electronic device is realized without the conductive resin layer interposed therebetween. Therefore, this configuration further suppresses the increase in the ESR.

In the one aspect, the element body may include the principal surface adjacent to the pair of end surfaces and arranged to constitute the mounting surface. The external electrode may further include a second electrode portion disposed on the principal surface and on a ridge portion located between the end surface and the principal surface. An average thickness of the conductive resin layer included in the first and second electrode portions may be smaller than an average thickness of the sintered metal layer included in the first and second electrode portions. In this configuration, the second electrode portion includes the conductive resin layer. Therefore, this configuration further suppresses the occurrence of a crack in the element body. In this configuration, an amount of conductive resin paste used for forming the conductive resin layer is reduced.

In the one aspect, the element body may further include a side surface adjacent to the pair of end surfaces and the principal surface. The external electrode may further include a third electrode portion disposed on the side surface and on a ridge portion located between the end surface and the side surface. An average thickness of the conductive resin layer included in the first and third electrode portions may be smaller than an average thickness of the sintered metal layer included in the first and third electrode portions. In this configuration, the third electrode portion includes the conductive resin layer. Therefore, this configuration further suppresses the occurrence of a crack in the element body. In this configuration, the amount of the conductive resin paste used for forming the conductive resin layer is reduced.

In the one aspect, the third electrode portion may include a third region, and a fourth region located closer to the principal surface than the third region. In the third region, the sintered metal layer is exposed from the conductive resin layer. In the fourth region, the sintered metal layer is covered with the conductive resin layer. In this configuration, the fourth region of the third electrode portion that is disposed on the side surface and on the ridge portion located between the end surface and the side surface includes the conductive resin layer. Therefore, the stress tends not to concentrate on the end edge of the external electrode even in the case where the external electrode includes the third electrode portion. The end edge of the external electrode tends not to serve as an origination of a crack. Consequently, this configuration surely suppresses the occurrence of a crack in the element body.

In this configuration, the sintered metal layer is exposed from the conductive resin layer In the third region of the third electrode portion. The third region does not include the conductive resin layer. In the third region, an electrical connection between the sintered metal layer and the electronic device is realized without the conductive resin layer interposed therebetween. Therefore, this configuration further suppresses the increase in the ESR.

In the one aspect, a width of the fourth region in a direction in which the pair of end surfaces opposes each other may decrease with an increase in distance from the second electrode portion. This configuration suppresses the occurrence of a crack in the element body. In this configuration, the amount of the conductive resin paste used for forming the conductive resin layer is further reduced.

In the one aspect, the sintered metal layer included in the second electrode portion may be entirely covered with the conductive resin layer. In this configuration, the stress tends not to concentrate on the end edge of the external electrode even in the case where the external electrode includes the second electrode portion. The end edge of the external electrode tends not to serve as an origination of a crack. Therefore, this configuration surely suppresses the occurrence of a crack in the element body.

In the one aspect, the first electrode portion may include the first region, and the second region located closer to the principal surface than the first region. In the first region, the sintered metal layer is exposed from the conductive resin layer. In the second region, the sintered metal layer is covered with the conductive resin layer. In this configuration, the stress tends not to concentrate on the end edge of the external electrode even in the case where the external electrode includes the first electrode portion. Therefore, this configuration surely suppresses the occurrence of a crack in the element body.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 13 is a side view of the multilayer capacitor according to the modification of the second embodiment.

DETAILED DESCRIPTION OF EMBODIMENTS

Figure 1:
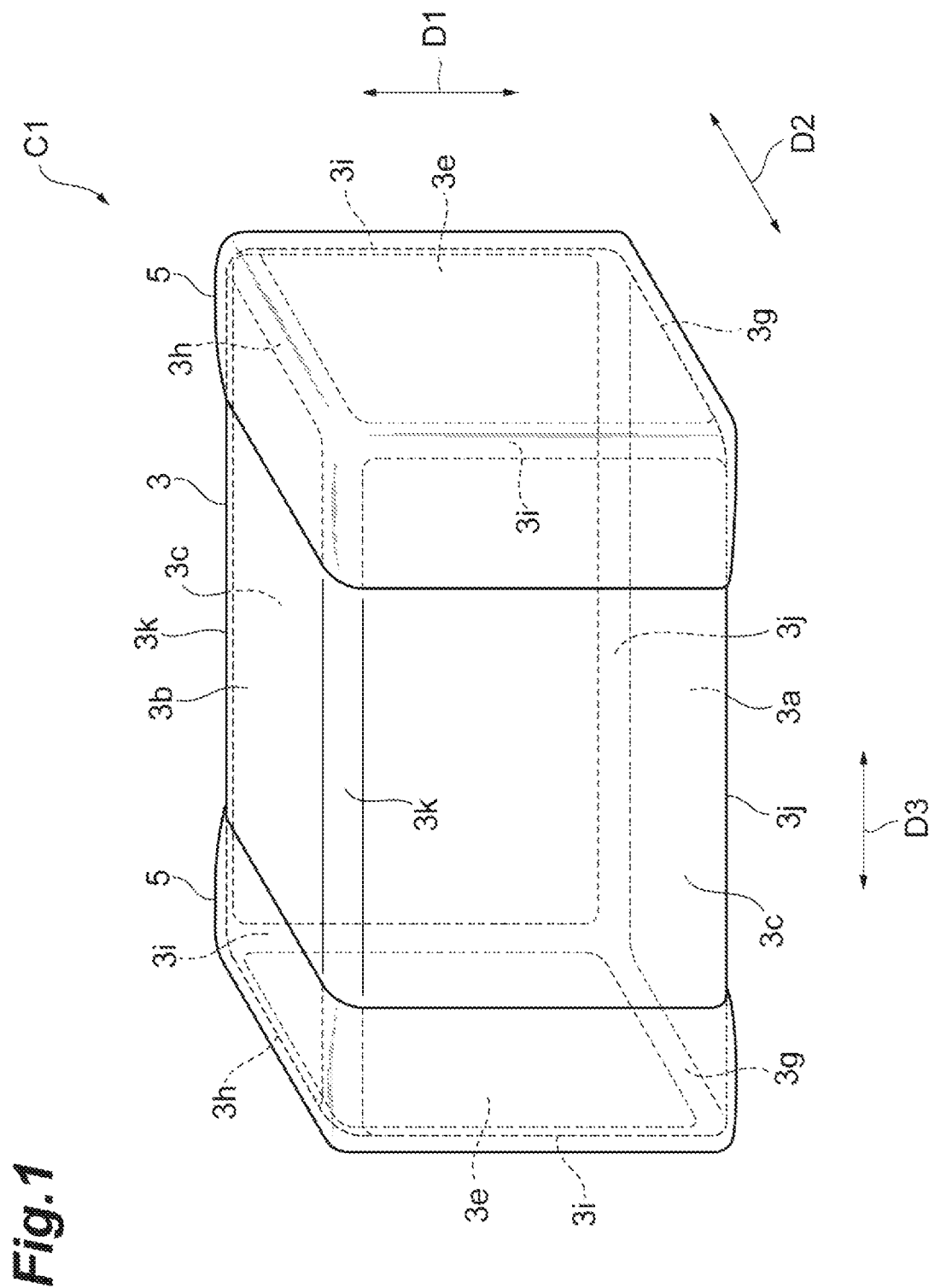
FIG. 1 is a perspective view of a multilayer capacitor according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
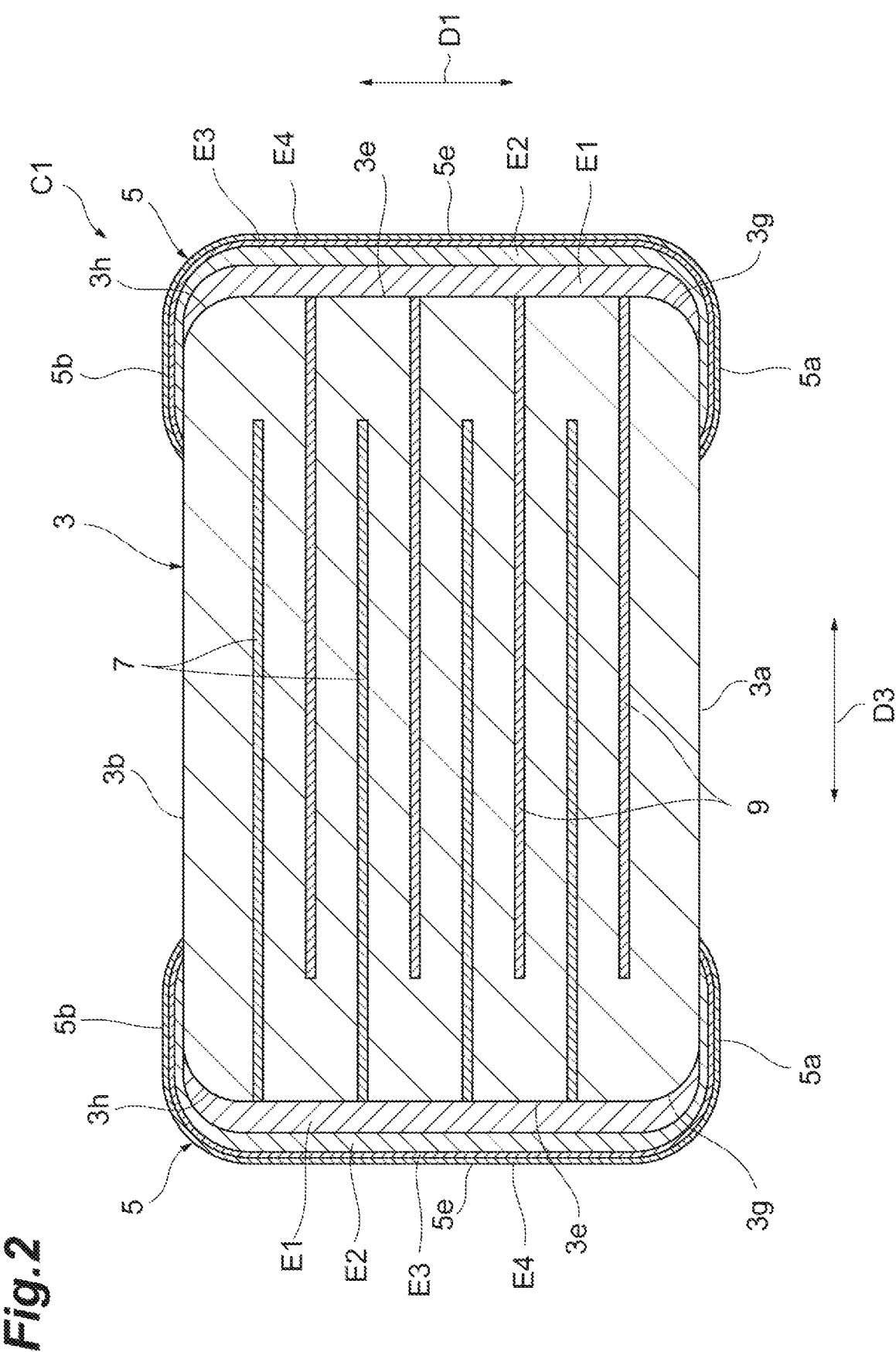
FIG. 2 is a view illustrating a cross-sectional configuration of the multilayer capacitor according to the first embodiment.
Figure 3:
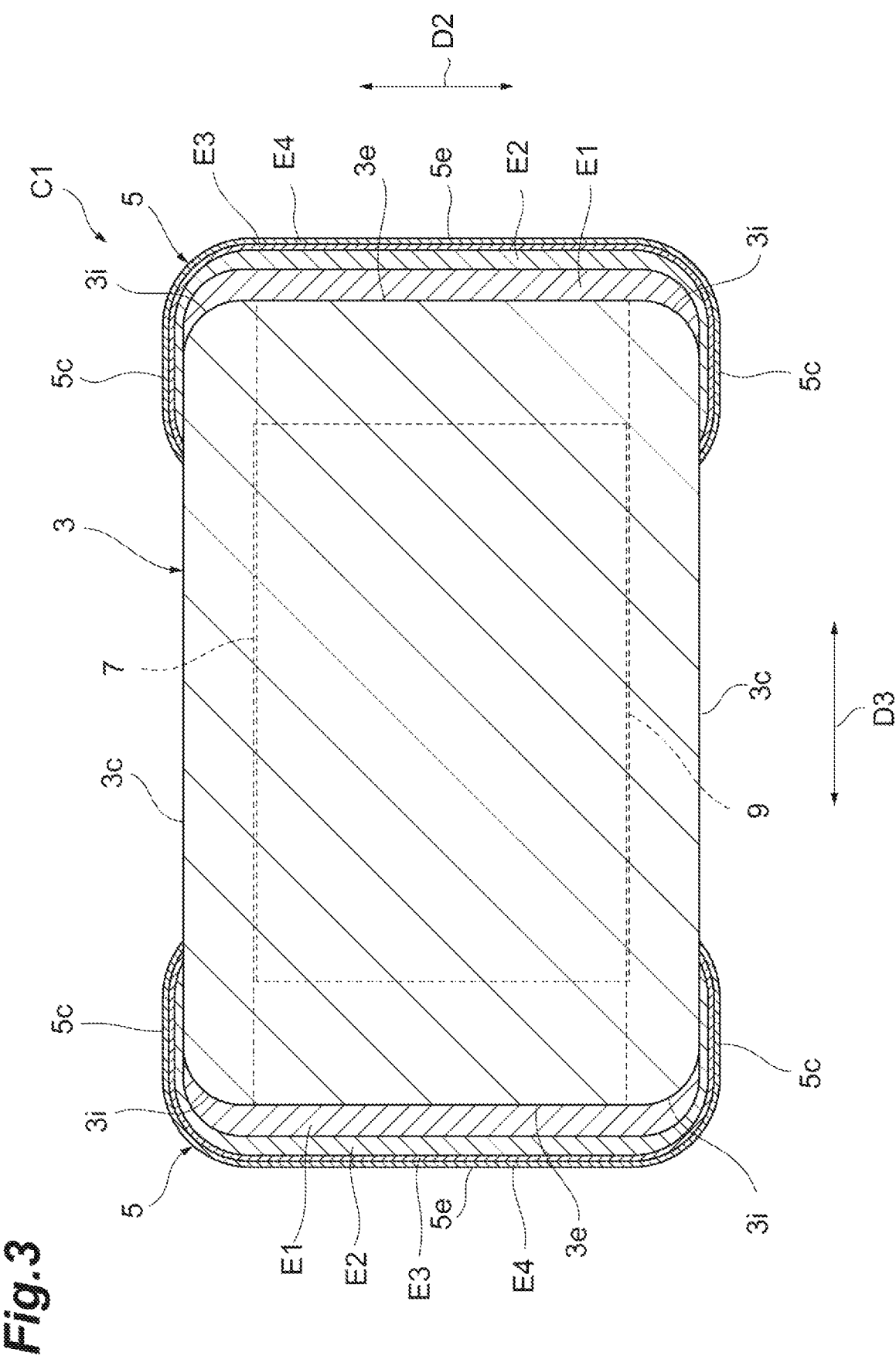
FIG. 3 is a view illustrating the cross-sectional configuration of the multilayer capacitor according to the first embodiment.

A configuration of a multilayer capacitor C1 according to a first embodiment will be described with reference to FIGS. 1 to 3. FIG. 1 is a perspective view of the multilayer capacitor according to the first embodiment. FIGS. 2 and 3 are views illustrating a cross-sectional configuration of the multilayer capacitor according to the first embodiment. In the first embodiment, an electronic component is, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on an outer surface of the element body 3. The pair of external electrodes 5 is spaced apart from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a and 3b opposing each other, a pair of side surfaces 3c opposing each other, and a pair of end surfaces 3e opposing each other. The pair of principal surfaces 3a and 3b and the pair of side surfaces 3c have a rectangular shape. The direction in which the pair of principal surfaces 3a and 3b opposes each other is a first direction D1. The direction in which the pair of side surfaces 3c opposes each other is a second direction D2. The direction in which the pair of end surfaces 3e opposes each other is a third direction D3.

The first direction D1 is a direction orthogonal to the respective principal surfaces 3a and 3b and is orthogonal to the second direction D2. The third direction D3 is a direction parallel to the respective principal surfaces 3a and 3b and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the first embodiment, a length of the element body 3 in the third direction D3 is larger than a length of the element body 3 in the first direction D1, and larger than a length of the element body 3 in the second direction D2. The third direction D3 is a longitudinal direction of the element body 3.

The pair of side surfaces 3c extends in the first direction D1 to couple the pair of principal surfaces 3a and 3b. The pair of side surfaces 3c also extends in the third direction D3. The pair of end surfaces 3e extends in the first direction D1 to couple the pair of principal surfaces 3a and 3b. The pair of end surfaces 3e also extends in the second direction D2.

The element body 3 includes a pair of ridge portions 3g, a pair of ridge portions 3h, four ridge portions 3i, a pair of ridge portions 3j, and a pair of ridge portions 3k. The ridge portion 3g is located between the end surface 3e and the principal surface 3a. The ridge portion 3h is located between the end surface 3e and the principal surface 3b. The ridge portion 3i is located between the end surface 3e and the side surface 3c. The ridge portion 3j is located between the principal surface 3a and the side surface 3c. The ridge portion 3k is located between the principal surface 3b and the side surface 3c. In the present embodiment, each of the ridge portions 3g, 3h, 3i, 3j, and 3k is rounded to curve. The element body 3 is subject to what is called a round chamfering process.

The end surface 3e and the principal surface 3a are indirectly adjacent to each other with the ridge portion 3g therebetween. The end surface 3e and the principal surface 3b are indirectly adjacent to each other with the ridge portion 3h therebetween. The end surface 3e and the side surface 3c are indirectly adjacent to each other with the ridge portion 3i therebetween. The principal surface 3a and the side surface 3c are indirectly adjacent to each other with the ridge portion 3j therebetween. The principal surface 3b and the side surface 3c are indirectly adjacent to each other with the ridge portion 3k therebetween.

The element body 3 is configured by laminating a plurality of dielectric layers in the first direction D1. The element body 3 includes the plurality of laminated dielectric layers. In the element body 3, a lamination direction of the plurality of dielectric layers coincides with the first direction D1. Each dielectric layer includes, for example, a sintered body of a ceramic green sheet containing a dielectric material. The dielectric material includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the second direction D2.

The multilayer capacitor C1 is solder-mounted on an electronic device (such as a circuit board or an electronic component). The principal surface 3a of the multilayer capacitor C1 opposes the electronic device. The principal surface 3a is arranged to constitute a mounting surface. The principal surface 3a is the mounting surface. The principal surface 3b may be the mounting surface opposing the electronic device.

As illustrated in FIGS. 2 and 3, the multilayer capacitor C1 includes a plurality of internal electrodes 7 and a plurality of internal electrodes 9. Each of the internal electrodes 7 and 9 is an internal conductor. Each of the internal electrodes 7 and 9 is made of a conductive material commonly used as an internal conductor of a multilayer electronic component. The conductive material includes, for example, a base metal. The conductive material includes, for example, Ni or Cu. Each of the internal electrodes 7 and 9 is configured as a sintered body of conductive paste containing the conductive material described above. In the first embodiment, the internal electrodes 7 and 9 are made of Ni.

The internal electrodes 7 and the internal electrodes 9 are disposed in different positions (layers) in the first direction D1. The internal electrodes 7 and the internal electrodes 9 are alternately disposed in the element body 3 to oppose each other in the first direction D1 with an interval therebetween. Polarities of the internal electrodes 7 and the internal electrodes 9 are different from each other. When the lamination direction of the plurality of dielectric layers is the second direction D2, the internal electrodes 7 and the internal electrodes 9 are disposed in different positions (layers) in the second direction D2. One end of each of the internal electrodes 7 and 9 is exposed at a corresponding end surface 3e. Each of the internal electrodes 7 and 9 includes one end exposed at the corresponding end surface 3e.

The external electrodes 5 are disposed at both end portions of the element body 3 in the third direction D3. Each of the external electrodes 5 is disposed on the corresponding end surface 3e side of the element body 3. The external electrode 5 includes a plurality of electrode portions 5a, 5b, 5c, and 5e. The electrode portion 5a is disposed on the principal surface 3a and on the ridge portion 3g. The electrode portion 5b is disposed on the principal surface 3b and on the ridge portion 3h. The electrode portion 5c is disposed on each side surface 3c and on each ridge portion 3i. The electrode portion 5e is disposed on the corresponding end surface 3e. The external electrode 5 also includes electrode portions disposed on the ridge portions 3j and 3k. The external electrode 5 is formed on the five surfaces, that is, the pair of principal surface s 3a and 3b, the pair of side surfaces 3c, and the end surface 3e, as well as on the ridge portions 3g, 3h, 3i, 3j, and 3k. The electrode portions 5a, 5b, 5c, and 5e adjacent each other are coupled and are electrically connected to each other.

Each electrode portion 5e disposed on each end surface 3e covers all one ends of the corresponding internal electrodes 7 or 9. Each of the internal electrodes 7 and 9 is directly connected to the corresponding electrode portion 5e. Each of the internal electrodes 7 and 9 is electrically connected to the corresponding external electrode 5.

As illustrated in FIGS. 2 and 3, the external electrode 5 includes a first electrode layer E1, a second electrode layer E2, a third electrode layer E3, and a fourth electrode layer E4. The fourth electrode layer E4 is the outermost layer of the external electrode 5. Each of the electrode portions 5a, 5b, 5c, and 5e includes the first electrode layer E1, the second electrode layer E2, the third electrode layer E3, and the fourth electrode layer E4. Each of the electrode portions 5a, 5b, 5c, and 5e is four-layered.

The first electrode layer E1 included in the electrode portion 5a is disposed on the ridge portion 3g, and is not disposed on the principal surface 3a. In the present embodiment, the first electrode layer E1 included in the electrode portion 5a is in contact with the entire ridge portion 3g. The principal surface 3a is not covered with the first electrode layer E1, thereby being exposed from the first electrode layer E1. The second electrode layer E2 included in the electrode portion 5a is disposed on the first electrode layer E1 and on the principal surface 3a. The first electrode layer E1 is entirely covered with the second electrode layer E2. The second electrode layer E2 included in the electrode portion 5a is in contact with the principal surface 3a. The electrode portion 5a is four-layered on the ridge portion 3g, and is three-layered on the principal surface 3a.

The first electrode layer E1 included in the electrode portion 5b is disposed on the ridge portion 3h, and is not disposed on the principal surface 3b. In the present embodiment, the first electrode layer E1 included in the electrode portion 5b is in contact with the entire ridge portion 3h. The principal surface 3b is not covered with the first electrode layer E1, thereby being exposed from the first electrode layer E1. The second electrode layer E2 included in the electrode portion 5b is disposed on the first electrode layer E1 and on the principal surface 3b. The first electrode layer E1 is entirely covered with the second electrode layer E2. The second electrode layer E2 included in the electrode portion 5b is in contact with the principal surface 3b. The electrode portion 5b is four-layered on the ridge portion 3h, and is three-layered on the principal surface 3b.

The first electrode layer E1 included in the electrode portion 5c is disposed on the ridge portion 3i, and is not disposed on the side surface 3c. In the present embodiment, the first electrode layer E1 included in the electrode portion 5c is in contact with the entire ridge portion 3i. The side surface 3c is not covered with the first electrode layer E1, thereby being exposed from the first electrode layer E1. The second electrode layer E2 included in the electrode portion 5c is disposed on the first electrode layer E1 and on the side surface 3c. The first electrode layer E1 is entirely covered with the second electrode layer E2. The second electrode layer E2 included in the electrode portion 5c is in contact with the side surface 3c. The electrode portion 5c is four-layered on the ridge portion 3i, and is three-layered on the side surface 3c.

The first electrode layer E1 included in the electrode portion 5e is disposed on the end surface 3e. The end surface 3e is entirely covered with the first electrode layer E1. The second electrode layer E2 included in the electrode portion 5e is disposed on the first electrode layer E1. The first electrode layer E1 is covered with the second electrode layer E2. In the external electrode 5, the first electrode layer E1 is entirely covered with the second electrode layer E2.

The first electrode layer E1 is formed by sintering conductive paste applied onto the surface of the element body 3. The first electrode layer E1 is formed to cover the end surface 3e and the ridge portions 3g, 3h, and 3i. The first electrode layer E1 is formed by sintering a metal component (metal powder) contained in the conductive paste. The first electrode layer E1 is a sintered metal layer. The first electrode layer E1 is a sintered metal layer formed on the element body 3. The first electrode layer E1 is not intentionally formed on the pair of principal surfaces 3a and 3b and the pair of side surfaces 3c. The first electrode layer E1 may be formed on the principal surfaces 3a and 3b and the side surfaces 3c due to a manufacturing error, for example.

In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent.

The second electrode layer E2 is formed by curing conductive resin paste applied onto the first electrode layer E1, the pair of principal surfaces 3a and 3b, and the pair of side surfaces 3c. The second electrode layer E2 is formed over the first electrode layer E1 and the element body 3. In the present embodiment, the second electrode layer E2 is formed to entirely cover the first electrode layer E1. The second electrode layer E2 is formed to cover the ridge portions 3j and 3k. The first electrode layer E1 also serves as an underlying metal layer for foaming the second electrode layer E2. The second electrode layer E2 is a conductive resin layer formed on the first electrode layer E1.

The conductive resin paste contains, for example, a resin, a conductive material, and an organic solvent. The resin is, for example, a thermosetting resin. The conductive material is, for example, metal powder. The metal powder is, for example, Ag powder or Cu powder. The thermosetting resin is, for example, a phenolic resin, an acrylic resin, a silicone resin, an epoxy resin, or a polyimide resin.

The third electrode layer E3 is farmed on the second electrode layer E2 by a plating method. In the present embodiment, the third electrode layer E3 is formed on the second electrode layer E2 by Ni plating. The third electrode layer E3 is a Ni plating layer. The third electrode layer E3 may be an Sn plating layer, a Cu plating layer, or an Au plating layer. The third electrode layer E3 contains, for example, Ni, Sn, Cu, or Au.

The fourth electrode layer E4 is formed on the third electrode layer E3 by a plating method. In the present embodiment, the fourth electrode layer E4 is formed on the third electrode layer E3 by Sn plating. The fourth electrode layer E4 is an Sn plating layer. The fourth electrode layer E4 may be a Cu plating layer or an Au plating layer. The fourth electrode layer E4 contains, for example, Sn, Cu, or Au. The third electrode layer E3 and fourth electrode layer E4 form a plating layer disposed on the second electrode layer E2. In the present embodiment, the plating layer disposed on the second electrode layer E2 is two-layered.

The first electrode layer E1 included in each of the electrode portions 5a, 5b, 5c, and 5e is integrally formed. The second electrode layer E2 included in each of the electrode portions 5a, 5b, 5c, and 5e is integrally formed. The third electrode layer E3 included in each of the electrode portions 5*a*, 5*b*, 5*c*, and 5*e* is integrally formed. The fourth electrode layer E4 included in each of the electrode portions 5*a*, 5*b*, 5*c*, and 5*e* is integrally formed.

An average thickness of the second electrode layer E2 is smaller than an average thickness of the first electrode layer E1. An average thickness of the first electrode layer E1 is, for example, 5 to 60 µm. The average thickness of the second electrode layer E2 is, for example, 3 to 50 µm. An average thickness of the third electrode layer E3 is, for example, 1 to 7 µm. An average thickness of the fourth electrode layer E4 is, for example, 1 to 7 µm.

The average thickness is obtained as exemplified below.

A cross-sectional view including the first electrode layer E1, the second electrode layer E2, the third electrode layer E3, and the fourth electrode layer E4 is obtained. This cross-sectional view is, for example, a cross-sectional view in which the first electrode layer E1, the second electrode layer E2, the third electrode layer E3, and the fourth electrode layer E4 are cut along a plane parallel to a pair of the surfaces opposing each other. Each area of the first electrode layer E1, the second electrode layer E2, the third electrode layer E3, and the fourth electrode layer E4 in the obtained cross-sectional view is calculated. Further, the plane mentioned above may be located at an equal distance from the pair of the surfaces.

The average thickness of the first electrode layer E1 is a quotient obtained by dividing the area of the first electrode layer E1 by a length of the first electrode layer E1 in the obtained cross-sectional view. The average thickness of the second electrode layer E2 is a quotient obtained by dividing the area of the second electrode layer E2 by a length of the second electrode layer E2 in the obtained cross-sectional view. The average thickness of the third electrode layer E3 is a quotient obtained by dividing the area of the third electrode layer E3 by a length of the third electrode layer E3 in the obtained cross-sectional view. The average thickness of the fourth electrode layer E4 is a quotient obtained by dividing the area of the fourth electrode layer E4 by a length of the fourth electrode layer E4 in the obtained cross-sectional view.

When the first electrode layer E1, the second electrode layer E2, the third electrode layer E3, and the fourth electrode layer E4 are cut along a plane parallel to the pair of side surfaces 3*c*, the average thickness of the first electrode layer E1 is the average thickness of the first electrode layer E1 included in the electrode portions 5*a*, 5*b*, and 5*e*. The first electrode layer E1 included in the electrode portions 5*a*, 5*b*, and 5*e* includes a portion of the first electrode layer E1 that is located on the ridge portions 3*g* and 3*h* and the end surface 3*e*. The average thickness of the second electrode layer E2 is the average thickness of the second electrode layer E2 included in the electrode portions 5*a*, 5*b*, and 5*e*. The second electrode layer E2 included in the electrode portions 5*a*, 5*b*, and 5*e* includes a portion of the second electrode layer E2 that is located on the principal surfaces 3*a* and 3*b*, the ridge portions 3*g* and 3*h*, and the end surface 3*e*.

The average thickness of the third electrode layer E3 is the average thickness of the third electrode layer E3 included in the electrode portions 5*a*, 5*b*, and 5*e*. The third electrode layer E3 included in the electrode portions 5*a*, 5*b*, and 5*e* includes a portion of the third electrode layer E3 that is located on the principal surfaces 3*a* and 3*b*, the ridge portions 3*g* and 3*h*, and the end surface 3*e*. The average thickness of the fourth electrode layer E4 is the average thickness of the fourth electrode layer E4 included in the electrode portions 5*a*, 5*b*, and 5*e*. The fourth electrode layer E4 included in the electrode portions 5*a*, 5*b*, and 5*e* includes a portion of the fourth electrode layer E4 that is located on the principal surfaces 3*a* and 3*b*, the ridge portions 3*g* and 3*h*, and the end surface 3*e*.

When the first electrode layer E1, the second electrode layer E2, the third electrode layer E3, and the fourth electrode layer E4 are cut along a plane parallel to the pair of principal surfaces 3*a* and 3*b*, the average thickness of the first electrode layer E1 is the average thickness of the first electrode layer E1 included in the electrode portions 5*c* and 5*e*. The first electrode layer E1 included in the electrode portions 5*c* and 5*e* includes a portion of the first electrode layer E1 that is located on the ridge portion 3*i* and the end surface 3*e*. The average thickness of the second electrode layer E2 is the average thickness of the second electrode layer E2 included in the electrode portions 5*c* and 5*e*. The second electrode layer E2 included in the electrode portions 5*c* and 5*e* includes a portion of the second electrode layer E2 that is located on the side surface 3*c*, the ridge portion 3*i*, and the end surface 3*e*.

The average thickness of the third electrode layer E3 is the average thickness of the third electrode layer E3 included in the electrode portions 5*c* and 5*e*. The third electrode layer E3 included in the electrode portions 5*c* and 5*e* includes a portion of the third electrode layer E3 that is located on the side surface 3*c*, the ridge portion 3*i*, and the end surface 3*e*. The average thickness of the fourth electrode layer E4 is the average thickness of the fourth electrode layer E4 included in the electrode portions 5*c* and 5*e*. The fourth electrode layer E4 included in the electrode portions 5*c* and 5*e* includes a portion of the fourth electrode layer E4 that is located on the side surface 3*c*, the ridge portion 3*i*, and the end surface 3*e*.

In the present embodiment, the average thickness of the second electrode layer E2 included in the electrode portions 5*a*, 5*b*, and 5*e* is smaller than the average thickness of the first electrode layer E1 included in the electrode portions 5*a*, 5*b*, and 5*e*. The average thickness of the second electrode layer E2 included in the electrode portions 5*a* and 5*e* is smaller than the average thickness of the first electrode layer E1 included in the electrode portions 5*a* and 5*e*. The average thickness of the second electrode layer E2 included in the electrode portions 5*c* and 5*e* is smaller than the average thickness of the first electrode layer E1 included in the electrode portions 5*c* and 5*e*.

In the present embodiment, the average thickness of the second electrode layer E2 included in the electrode portion 5*e* is smaller than the average thickness of the first electrode layer E1 included in the electrode portion 5*e*. The second electrode layer E2 included in the electrode portion 5*e* includes a portion of the second electrode layer E2 that is located on the end surface 3*e*. The first electrode layer E1 included in the electrode portion 5*e* includes a portion of the first electrode layer E1 that is located on the end surface 3*e*. The average thickness of the first electrode layer E1 included in the electrode portion 5*e* is, for example, 5 to 60 µm. The average thickness of the second electrode layer E2 included in the electrode portion 5*e* is, for example, 3 to 50 µm.

Each average thickness of the second electrode layer E2 included in the electrode portion 5*e* and the first electrode layer E1 included in the electrode portion 5*e* is obtained as exemplified above.

Each area of, in the obtained cross-sectional view described above, the portions of the first electrode layer E1 and the second electrode layer E2 located on the end surface 3*e* is obtained. The average thickness of the portion of the first electrode layer E1 that is located on the end surface 3*e* is a quotient obtained by dividing the area of the portion of the first electrode layer E1 that is located on the end surface 3e by the length of the portion of the first electrode layer E1 that is located on the end surface 3e in the obtained cross-sectional view. The average thickness of the portion of the second electrode layer E2 that is located on the end surface 3e is a quotient obtained by dividing the area of the portion of the second electrode layer E2 that is located on the end surface 3e by the length of the portion of the second electrode layer E2 that is located on the end surface 3e in the obtained cross-sectional view.

As described above, in the first embodiment, the second electrode layer E2 includes the conductive material and the resin. Electric resistance of the second electrode layer E2 is larger than electric resistance of the first electrode layer E1. The more the thickness of the second electrode layer E2 increases, the more the electric resistance of the second electrode layer E2 increases. In the multilayer capacitor C1, the average thickness of the second electrode layer E2 is smaller than the average thickness of the first electrode layer E1. This configuration suppresses an increase in ESR, as compared with a configuration in which the average thickness of the second electrode layer E2 is equal to or more than that of the first electrode layer E1.

It is generally understood that the more the thickness of the second electrode layer E2 increases, the more an effect of suppressing occurrence of a crack increases. In contrast, according to new findings of the present inventors, the configuration in which the second electrode layer E2 is formed over the first electrode layer E1 and the element body 3 suppresses the occurrence of a crack in the element body 3 even in a case where the average thickness of the second electrode layer E2 is smaller than the average thickness of the first electrode layer E1.

In the multilayer capacitor C1, the electrode portion 5e includes the second electrode layer E2. Therefore, stress tends not to concentrate on the end edge of the external electrode 5 even in the case where the external electrode 5 includes the electrode portion 5e. Consequently, the multilayer capacitor C1 surely suppresses the occurrence of a crack in the element body 3.

In the multilayer capacitor C1, the one end of each of the internal electrodes 7 and 9 is exposed at the corresponding end surface 3e and is directly connected to the external electrode 5. Therefore, the electrode portion 5e disposed on the end surface 3e exerts large influence on the ESR. In the multilayer capacitor C1, the average thickness of the second electrode layer E2 included in the electrode portion 5e is smaller than the average thickness of the first electrode layer E1 included in the electrode portion 5e. This configuration surely suppresses the increase in the ESR.

The external electrode 5 includes the electrode portion 5a. The average thickness of the second electrode layer E2 included in the electrode portions 5a and 5e is smaller than the average thickness of the first electrode layer E1 included in the electrode portions 5a and 5e. In the multilayer capacitor C1, the electrode portion 5a includes the second electrode layer E2. This configuration further suppresses the occurrence of a crack in the element body 3. An amount of conductive resin paste used for forming the second electrode layer E2 is reduced.

The external electrode 5 includes the electrode portion 5c. The average thickness of the second electrode layer E2 included in the electrode portions 5c and 5e is smaller than the average thickness of the first electrode layer E1 included in the electrode portions 5c and 5e. In the multilayer capacitor C1, the electrode portion 5c includes the second electrode layer E2. This configuration further suppresses the occurrence of a crack in the element body 3. The amount of conductive resin paste used for forming the second electrode layer E2 is reduced.

In the electrode portion 5a, the first electrode layer E1 is entirely covered with the second electrode layer E2. Therefore, in the multilayer capacitor C1, the stress tends not to concentrate on the end edge of the external electrode 5 even in the case where the external electrode 5 includes the electrode portion 5a. The end edge of the external electrode 5 tends not to serve as an origination of a crack. Consequently, the multilayer capacitor C1 surely suppresses the occurrence of a crack in the element body 3.

The end edge of the first electrode layer E1 is not located on the principal surfaces 3a and 3b and the side surface 3c. Therefore, in the multilayer capacitor C1, even in the case where the stress concentrates on the end edge of the first electrode layer E1, a crack tends not to occur in the element body 3, as compared with a multilayer capacitor in which the end edge of the first electrode layer E1 is located on the principal surfaces 3a and 3b and the side surface 3c.

Figure 4:
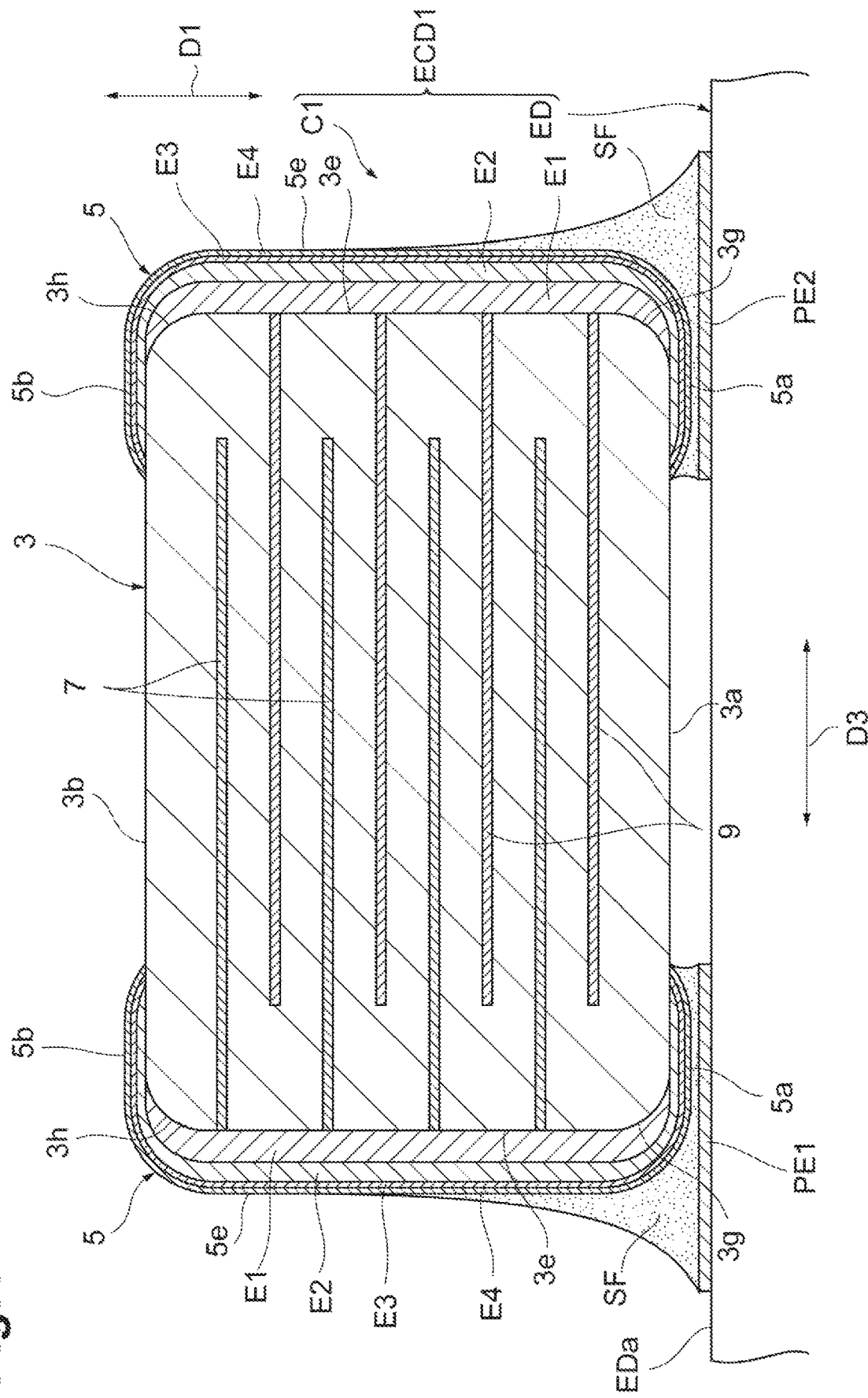
FIG. 4 is a view illustrating a mounted structure of the multilayer capacitor according to the first embodiment.

Next, a mounted structure of the multilayer capacitor C1 will be described with reference to FIG. 4. FIG. 4 is a view illustrating a mounted structure of a multilayer capacitor according to the first embodiment.

As illustrated in FIG. 4, an electronic component device ECD1 includes the multilayer capacitor C1 and an electronic device ED. The electronic device ED is, for example, a circuit board or an electronic component.

The multilayer capacitor C1 is solder-mounted on the electronic device ED. The electronic device ED includes a principal surface EDa and two pad electrodes PE1 and PE2. Each of the pad electrodes PE1 and PE2 is disposed on the principal surface EDa. The two pad electrodes PE1 and PE2 are spaced apart from each other. The multilayer capacitor C1 is disposed on the electronic device ED in such a manner that the principal surface 3a and the principal surface EDa oppose each other. As described above, the principal surface 3a is a mounting surface.

When the multilayer capacitor C1 is solder-mounted, molten solder wets to the external electrodes 5 (fourth electrode layer E4). Solder fillets SF are formed on the external electrodes 5 by solidification of the wet solder. The corresponding external electrodes 5 and pad electrodes PE1 and PE2 are coupled via the solder fillets SF.

As described above, the electronic component device ECD1 suppresses the occurrence of a crack in the element body 3 and suppresses the increase in the ESR.

Second Embodiment

Figure 5:
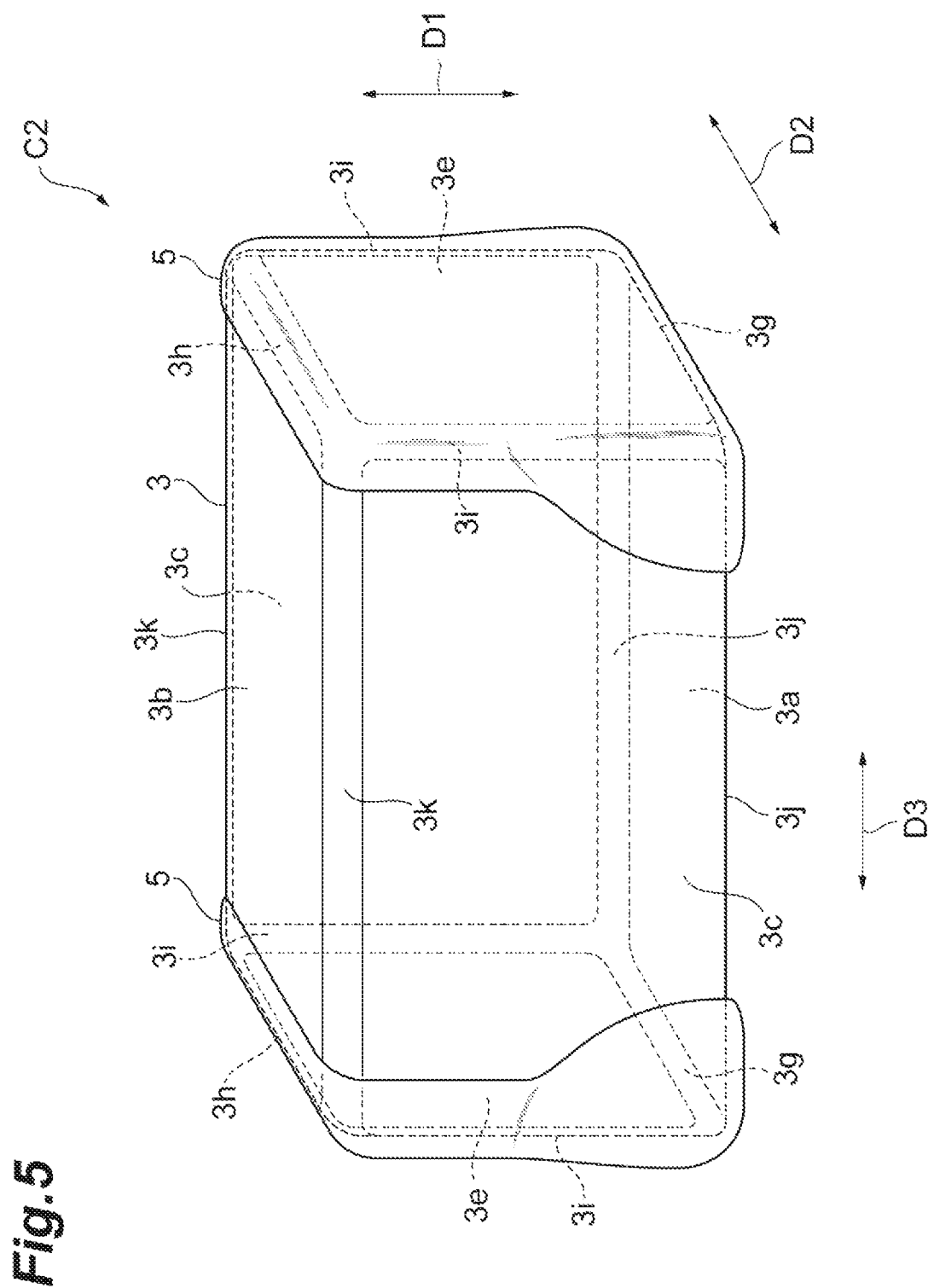
FIG. 5 is a perspective view of a multilayer capacitor according to a second embodiment.
Figure 6:
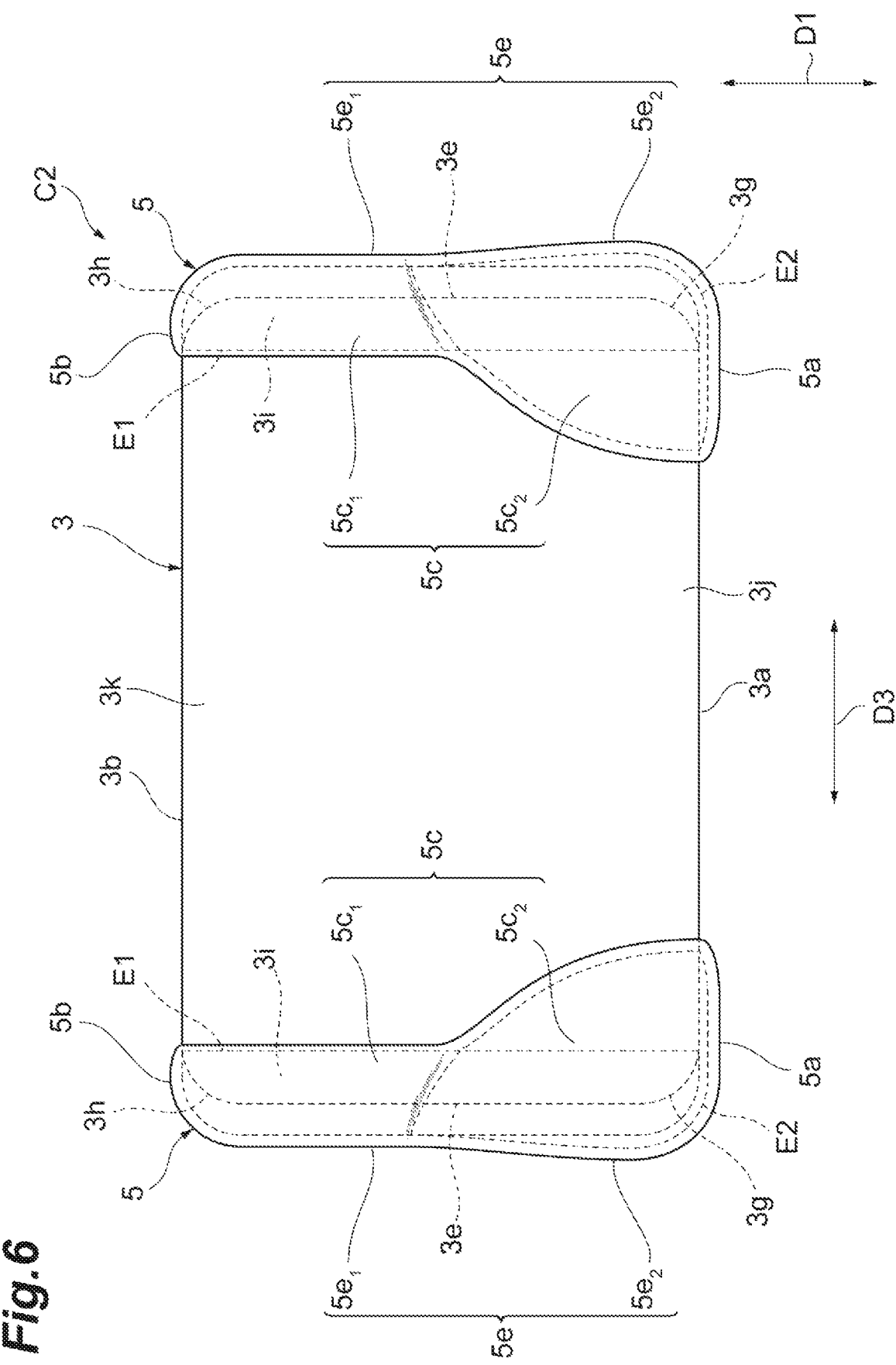
FIG. 6 is a side view of the multilayer capacitor according to the second embodiment.
Figure 7:
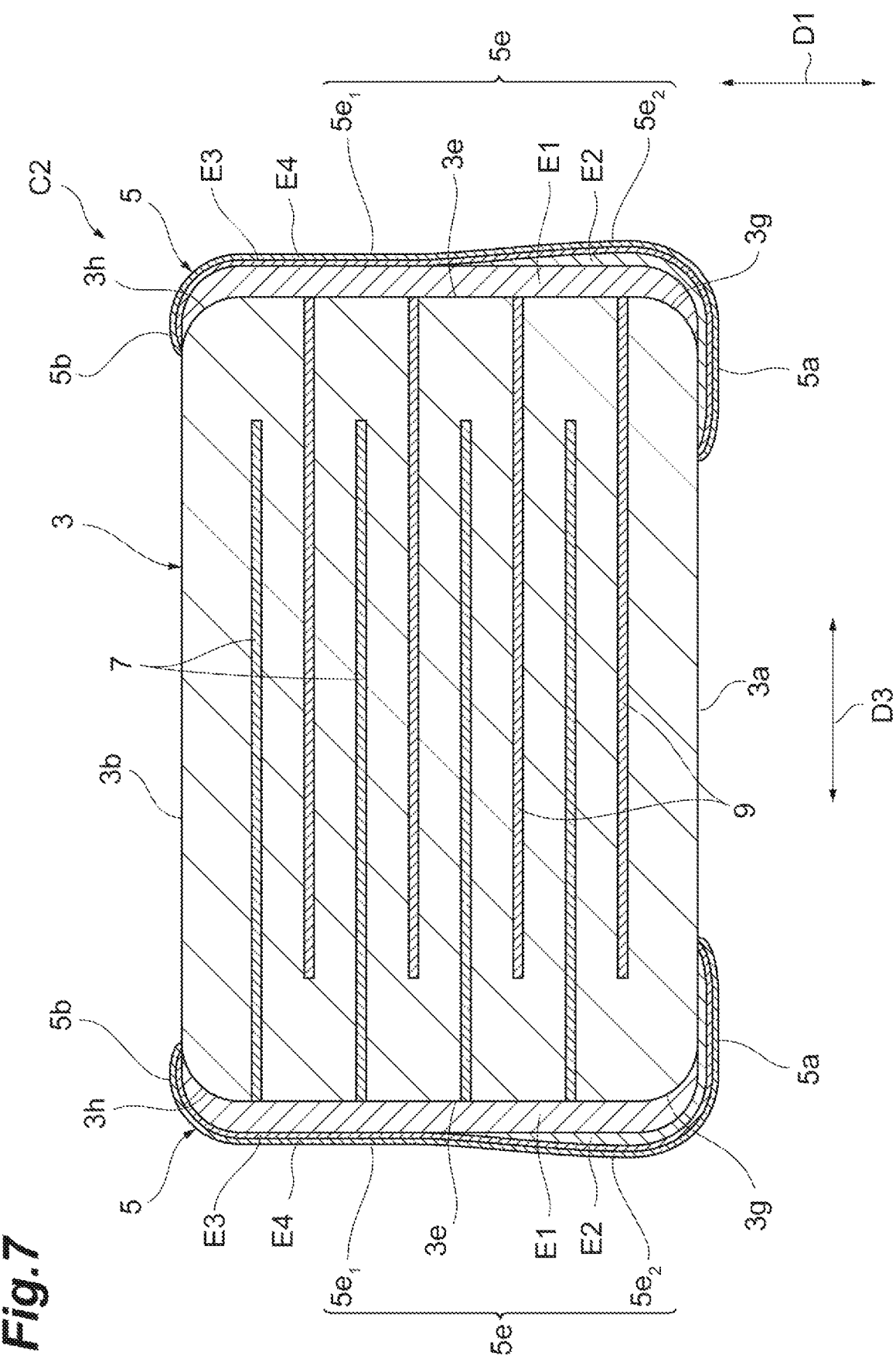
FIG. 7 is a view illustrating a cross-sectional configuration of the multilayer capacitor according to the second embodiment.
Figure 8:
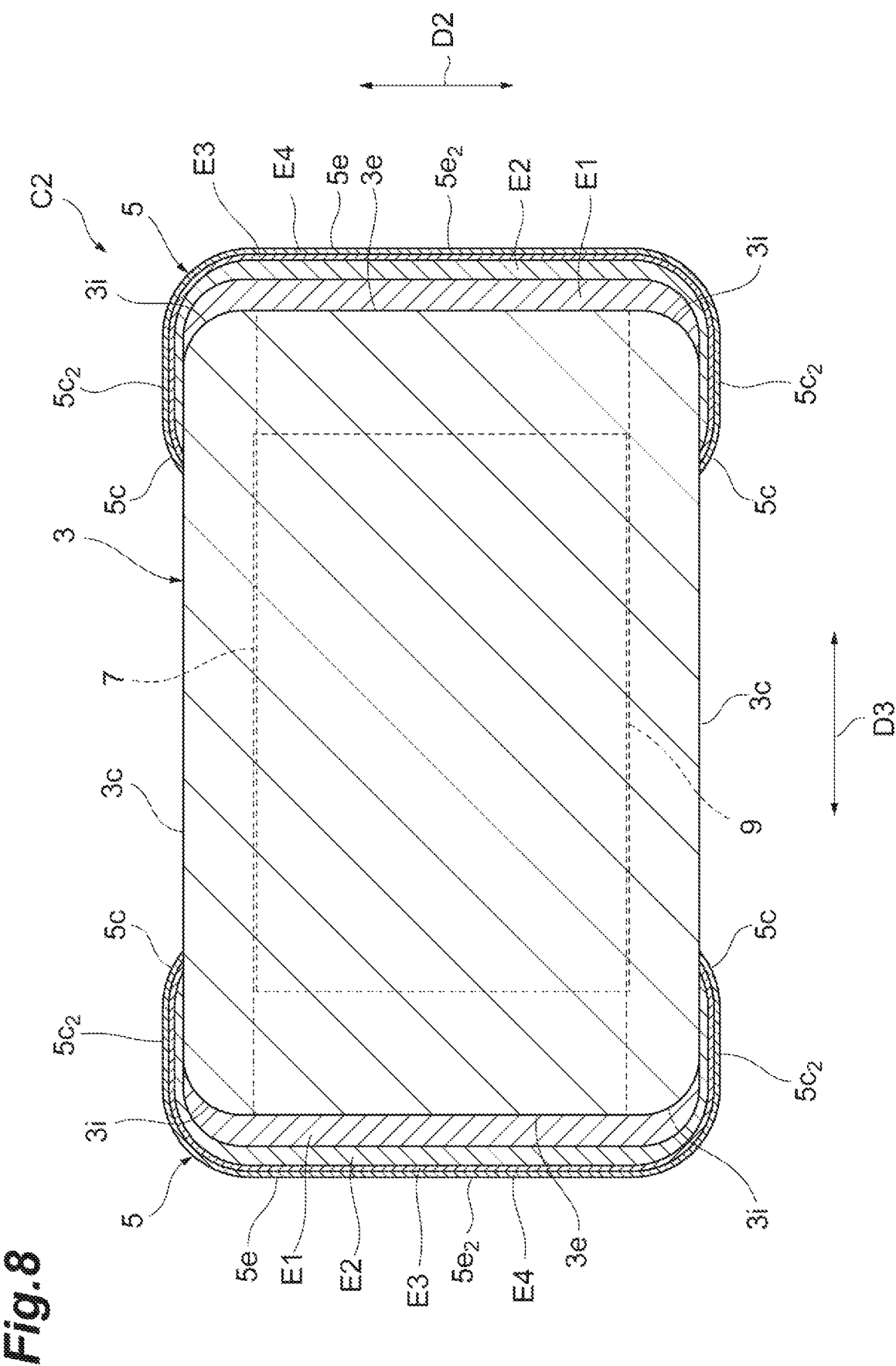
FIG. 8 is a view illustrating the cross-sectional configuration of the multilayer capacitor according to the second embodiment.
Figure 9:
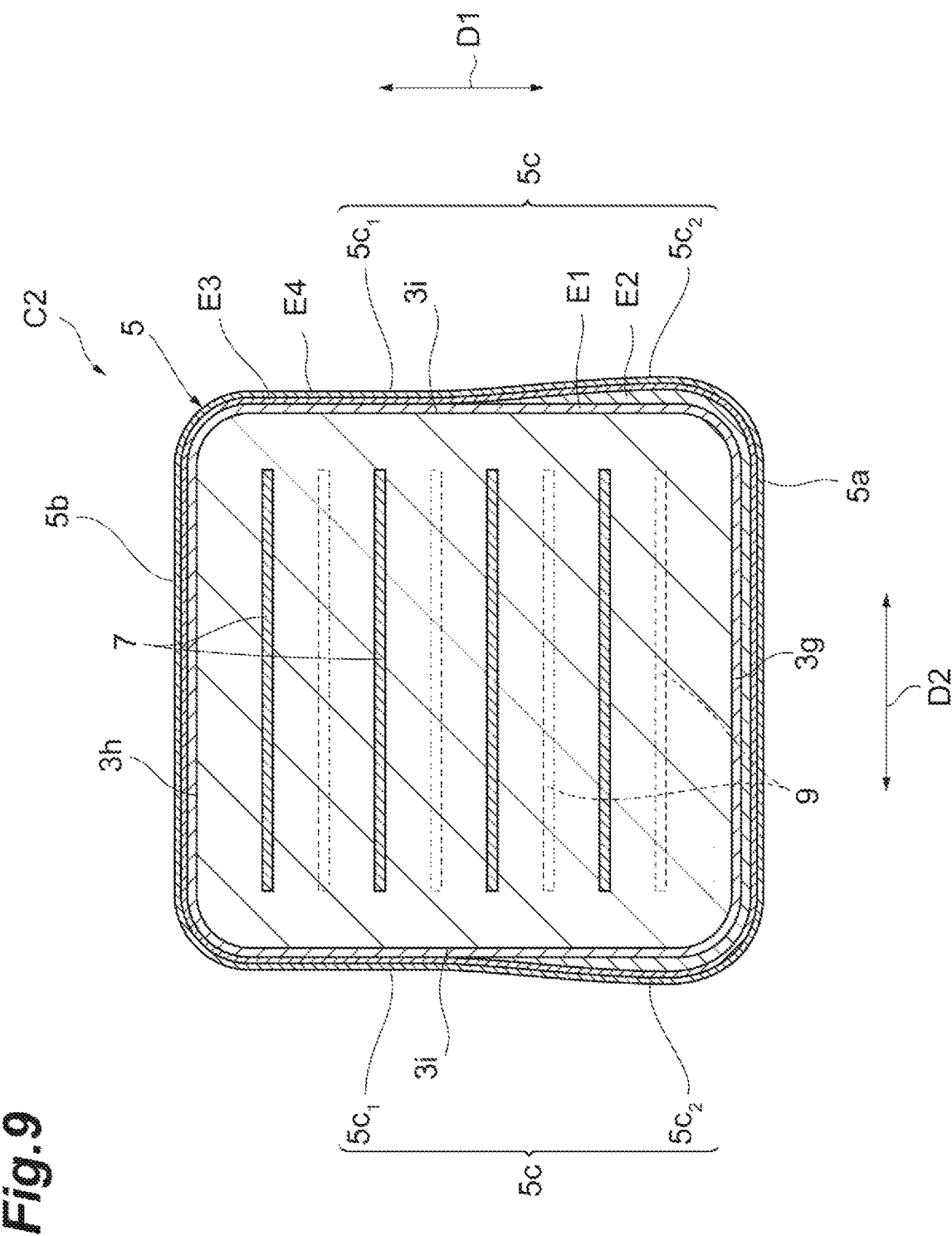
FIG. 9 is a view illustrating the cross-sectional configuration of the multilayer capacitor according to the second embodiment.

A configuration of a multilayer capacitor C2 according to a second embodiment will be described with reference to FIGS. 5 to 9. FIG. 5 is a perspective view of the multilayer capacitor according to the second embodiment. FIG. 6 is a side view of the multilayer capacitor according to the second embodiment. FIGS. 7 to 9 are views illustrating cross-sectional configurations of the multilayer capacitor according to the second embodiment. In the second embodiment, an electronic component is, for example, the multilayer capacitor C2. Hereinafter, differences between the multilayer capacitor C1 and the multilayer capacitor C2 will be mainly described.

As illustrated in FIG. 5, the multilayer capacitor C2 includes an element body 3 of a rectangular parallelepiped shape and a plurality of external electrodes 5. The multilayer capacitor C2 includes a pair of external electrodes 5. The pair of external electrodes 5 is disposed on an outer surface of the element body 3. As illustrated in FIG. 7, the multilayer capacitor C2 includes a plurality of internal electrodes 7 and a plurality of internal electrodes 9.

As illustrated in FIGS. 7 to 9, the external electrode 5 includes a plurality of electrode portions $5a$, $5b$, $5c$ and $5e$. The electrode portion $5a$ is disposed on a principal surface $3a$ and a ridge portion $3g$. The electrode portion $5b$ is disposed on a ridge portion $3h$. The electrode portion $5c$ is disposed on each side surface $3c$ and each ridge portion $3i$. The electrode portion $5e$ is disposed on a corresponding end surface $3e$. The external electrode 5 also includes electrode portions disposed on ridge portions $3j$. The external electrode 5 is formed on the four surfaces, that is, the principal surface $3a$, the pair of side surfaces $3c$, and the end surface $3e$, as well as on the ridge portions $3g$, $3h$, $3i$, and $3j$. In the present embodiment, the external electrode 5 is not intentionally formed on a principal surface $3b$.

The external electrode 5 includes a first electrode layer E1, a second electrode layer E2, a third electrode layer E3, and a fourth electrode layer E4.

The electrode portion $5a$ includes the first electrode layer E1, the second electrode layer E2, the third electrode layer E3, and the fourth electrode layer E4. The electrode portion $5a$ is four-layered on the ridge portion $3g$, and is three-layered on the principal surface $3a$. In the electrode portion $5a$, the first electrode layer E1 is entirely covered with the second electrode layer E2. The electrode portion $5b$ includes the first electrode layer E1, the third electrode layer E3, and the fourth electrode layer E4. The electrode portion $5b$ does not include the second electrode layer E2. The electrode portion $5b$ is three-layered.

The electrode portion $5c$ includes a region $5c_1$ and a region $5c_2$. The region $5c_2$ is located closer to the principal surface $3a$ than the region $5c_1$. The region $5c_1$ includes the first electrode layer E1, the third electrode layer E3, and the fourth electrode layer E4. The region $5c_1$ does not include the second electrode layer E2. The region $5c_1$ is three-layered. The region $5c_2$ includes the first electrode layer E1, the second electrode layer E2, the third electrode layer E3, and the fourth electrode layer E4. The region $5c_2$ is four-layered on the ridge portion $3i$, and is three-layered on the side surface $3c$. The region $5c_1$ is the region where the first electrode layer E1 is exposed from the second electrode layer E2. The region $5c_2$ is the region where the first electrode layer E1 is covered with the second electrode layer E2.

The electrode portion $5e$ includes a region $5e_1$ and a region $5e_2$. The region $5e_2$ is located closer to the principal surface $3a$ than the region $5e_1$. The region $5e_1$ includes the first electrode layer E1, the third electrode layer E3, and the fourth electrode layer E4. The region $5e_1$ does not include the second electrode layer E2. The region $5e_1$ is three-layered. The region $5e_2$ includes the first electrode layer E1, the second electrode layer E2, the third electrode layer E3, and the fourth electrode layer E4. The region $5e_2$ is four-layered. The region $5e_1$ is the region where the first electrode layer E1 is exposed from the second electrode layer E2. The region $5e_2$ is the region where the first electrode layer E1 is covered with the second electrode layer E2.

The first electrode layer E1 is formed to cover the end surface $3e$ and the ridge portions $3g$, $3h$, and $3i$. The first electrode layer E1 is not intentionally formed on the pair of principal surfaces $3a$ and $3b$ and the pair of side surfaces $3c$. The first electrode layer E1 may be formed on the principal surfaces $3a$ and $3b$ and the side surfaces $3c$ due to a manufacturing error, for example.

The second electrode layer E2 is formed to cover a partial region of the first electrode layer E1. In the present embodiment, the second electrode layer E2 covers the regions, of the first electrode layer E1, corresponding to the electrode portion $5a$, the region $5c_2$ of the electrode portion $5c$, and the region $5e_2$ of the electrode portion $5e$. The second electrode layer E2 is formed over the above-described partial region of the first electrode layer E1 and the element body 3.

The third electrode layer E3 is formed on the second electrode layer E2 and the first electrode layer E1. The third electrode layer E3 is formed on a portion of the first electrode layer E1 exposed from the second electrode layer E2. The fourth electrode layer E4 is formed on the third electrode layer E3.

In the multilayer capacitor C2, in the same manner as in the multilayer capacitor C1, the average thickness of the second electrode layer E2 is smaller than the average thickness of the first electrode layer E1. The average thickness of the second electrode layer E2 included in the electrode portion $5a$ and the region $5e_2$ of the electrode portion $5e$ is smaller than the average thickness of the first electrode layer E1 included in the electrode portions $5a$, $5b$, and $5e$. The average thickness of the second electrode layer E2 included in the electrode portion $5a$ and the region $5e_2$ of the electrode portion $5e$ is smaller than the average thickness of the first electrode layer E1 included in the electrode portions $5a$ and $5e$. The average thickness of the second electrode layer E2 included in the electrode portion $5c$ and the region $5e_2$ of the electrode portion $5e$ is smaller than the average thickness of the first electrode layer E1 included in the electrode portions $5c$ and $5e$.

In the multilayer capacitor C2, in the same manner as in the multilayer capacitor C1, the average thickness of the second electrode layer E2 included in the electrode portion $5e$ is smaller than the average thickness of the first electrode layer E1 included in the electrode portion $5e$.

A width of the region $5c_2$ in a third direction D3 decreases with an increase in distance from the electrode portion $5a$. A width of the region $5c_2$ in a first direction D1 decreases with an increase in distance from the electrode portion $5e$. In the present embodiment, an end edge of the region $5c_2$ has a substantially arc shape when viewed from a second direction D2. The region $5c_2$ has a substantially fan shape when viewed from a second direction D2. In the present embodiment, the width of the second electrode layer E2 viewed from the second direction D2 also decreases with an increase in distance from the electrode portion $5a$. An end edge of the second electrode layer E2 has a substantially arc shape.

As described above, in the second embodiment, in the same manner as in the first embodiment, the average thickness of the second electrode layer E2 is smaller than the average thickness of the first electrode layer E1. Therefore, this configuration suppresses an increase in ESR, as compared with a configuration in which the average thickness of the second electrode layer E2 is equal to or more than that of the first electrode layer E1. In the multilayer capacitor C2 as well, the second electrode layer E2 is formed over the first electrode layer E1 and the element body 3. Therefore, this configuration suppresses occurrence of a crack in the element body 3.

In the multilayer capacitor C2, the region $5e_2$ of the electrode portion $5e$ includes the second electrode layer E2. Therefore, stress tends not to concentrate on an end edge of the external electrode 5 even in the case where the external electrode 5 includes the electrode portion $5e$. For example, the stress tends not to concentrate on an end edge of a portion located near to the principal surface 3a, within the external electrode 5. Consequently, the configuration in which the region $5e_2$ includes the second electrode layer E2 surely suppresses the occurrence of a crack in the element body 3.

In the multilayer capacitor C2 as well, the average thickness of the second electrode layer E2 included in the electrode portion 5e is smaller than the average thickness of the first electrode layer E1 included in the electrode portion 5e. Therefore, this configuration surely suppresses an increase in the ESR.

In the region $5e_1$ of the electrode portion 5e, the first electrode layer E1 is exposed from the second electrode layer E2. The region $5e_1$ does not include the second electrode layer E2. In the region $5e_1$, an electrical connection between the first electrode layer E1 and an electronic device is realized without the second electrode layer E2 interposed therebetween. Therefore, this configuration further suppresses the increase in the ESR.

The average thickness of the second electrode layer E2 included in the electrode portions 5a and 5e is smaller than the average thickness of the first electrode layer E1 included in the electrode portions 5a and 5e. In the multilayer capacitor C2 as well, the electrode portion 5a includes the second electrode layer E2. Therefore, this configuration further suppresses the occurrence of a crack in the element body 3. An amount of the conductive resin paste used for forming the second electrode layer E2 is reduced.

The average thickness of the second electrode layer E2 included in the electrode portions 5c and 5e is smaller than the average thickness of the first electrode layer E1 included in the electrode portions 5c and 5e. In the multilayer capacitor C2 as well, the electrode portion 5c includes the second electrode layer E2. Therefore, this configuration further suppresses the occurrence of a crack in the element body. The amount of the conductive resin paste used for forming the second electrode layer E2 is reduced.

The region $5c_2$ of the electrode portion 5c includes the second electrode layer E2. Therefore, the stress tends not to concentrate on the end edge of the external electrode 5 even in the case where the external electrode 5 includes the electrode portion 5c. The end edge of the external electrode 5 tends not to serve as an origination of a crack. Consequently, the configuration in which the region $5c_2$ includes the second electrode layer E2 surely suppresses the occurrence of a crack in the element body 3.

In the multilayer capacitor C2, the first electrode layer E1 is exposed from the second electrode layer E2 in the region $5c_1$ of the electrode portion 5c. The region $5c_1$ does not include the second electrode layer E2. In the region $5c_1$, an electrical connection between the first electrode layer E1 and the electronic device is realized without the second electrode layer E2 interposed therebetween. Therefore, this configuration further suppresses the increase in the ESR.

In the multilayer capacitor C2, the width of the region $5c_2$ in the third direction D3 decreases with an increase in distance from the electrode portion 5a. This configuration suppresses the occurrence of a crack in the element body 3. In this configuration, the amount of the conductive resin paste used for forming the second electrode layer E2 is further reduced.

In the multilayer capacitor C2 as well, the first electrode layer E1 included in the electrode portion 5a is entirely covered with the second electrode layer E2. Therefore, the stress tends not to concentrate on the end edge of the external electrode 5, and thus the end edge of the external electrode 5 tends not to serve as an origination of a crack. Consequently, the configuration in which the first electrode layer E1 included in the electrode portion 5a is entirely covered with the second electrode layer E2 surely suppresses the occurrence of a crack in the element body 3.

Figure 10:
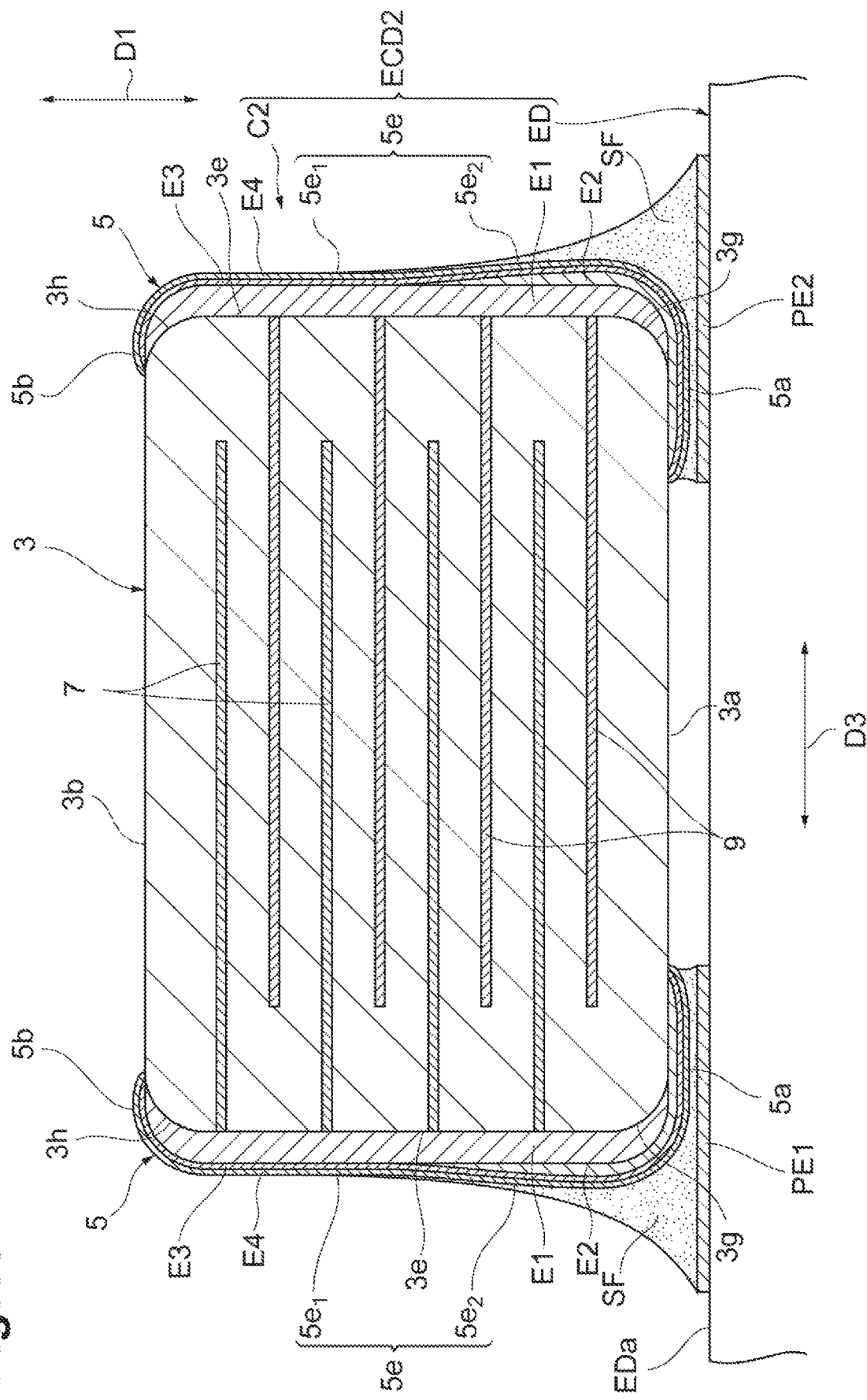
FIG. 10 is a view illustrating a mounted structure of the multilayer capacitor according to the second embodiment.

Next, a mounted structure of the multilayer capacitor C2 will be described with reference to FIG. 10. FIG. 10 is a view illustrating a mounted structure of the multilayer capacitor according to the second embodiment.

As illustrated in FIG. 10, an electronic component device ECD2 includes the multilayer capacitor C2 and an electronic device ED. The multilayer capacitor C2 is solder-mounted on the electronic device ED.

Solder fillets SF are formed in the regions $5e_1$ and $5e_2$ of the electrode portion 5e. That is, in addition to the region $5e_2$, the region $5e_1$ that does not include the second electrode layer E2 is also coupled to pad electrodes PE1 and PE2 via the solder fillets SF. Although illustration is omitted, the solder fillets SF are also formed in the regions $5c_1$ and $5c_2$ of the electrode portion 5c. As described above, the electronic component device ECD2 also suppresses the occurrence of a crack in the element body 3 and suppresses the increase in the ESR.

Figure 11:
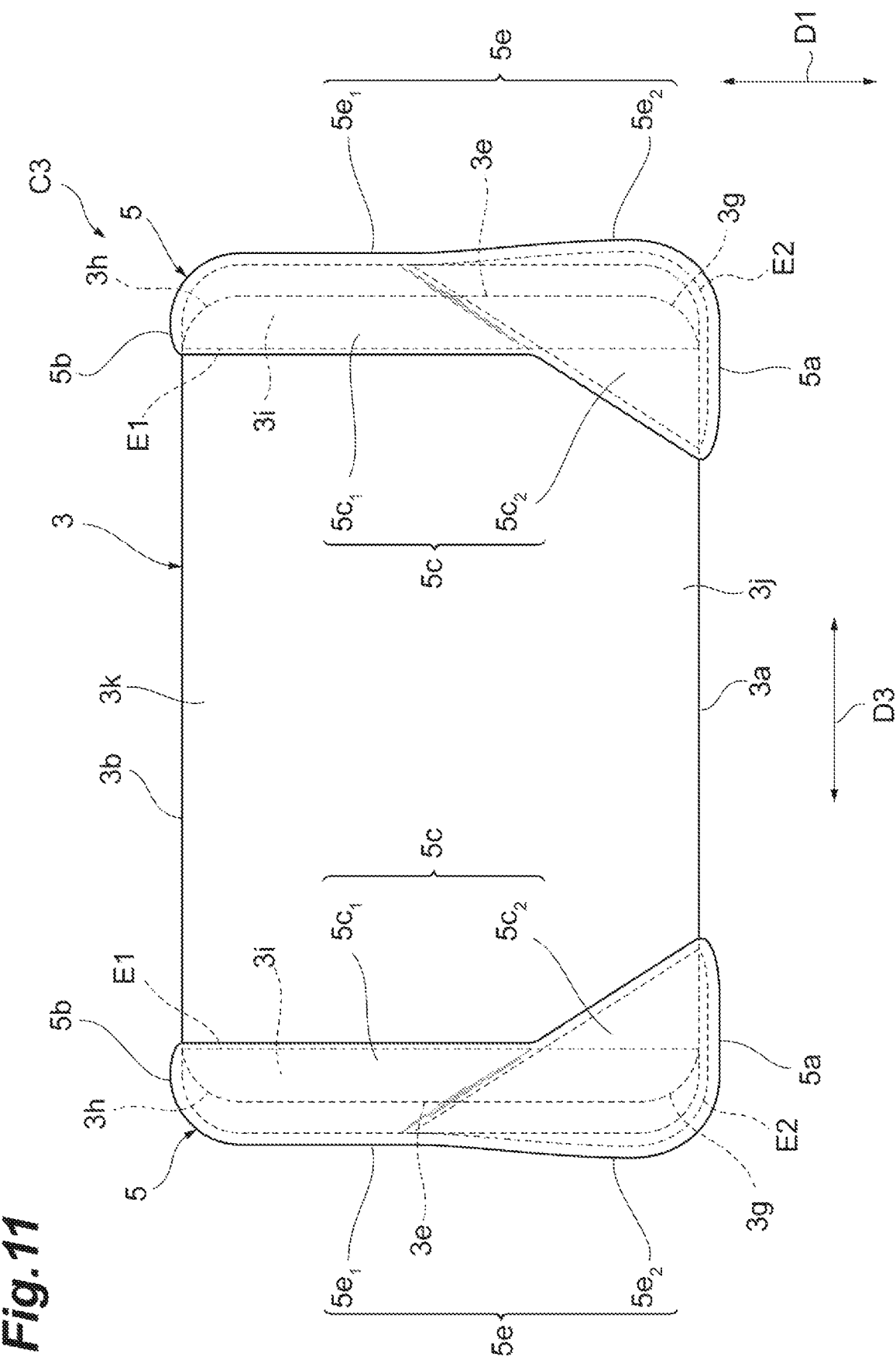
FIG. 11 is a side view of a multilayer capacitor according to a modification of the second embodiment.
Figure 12:
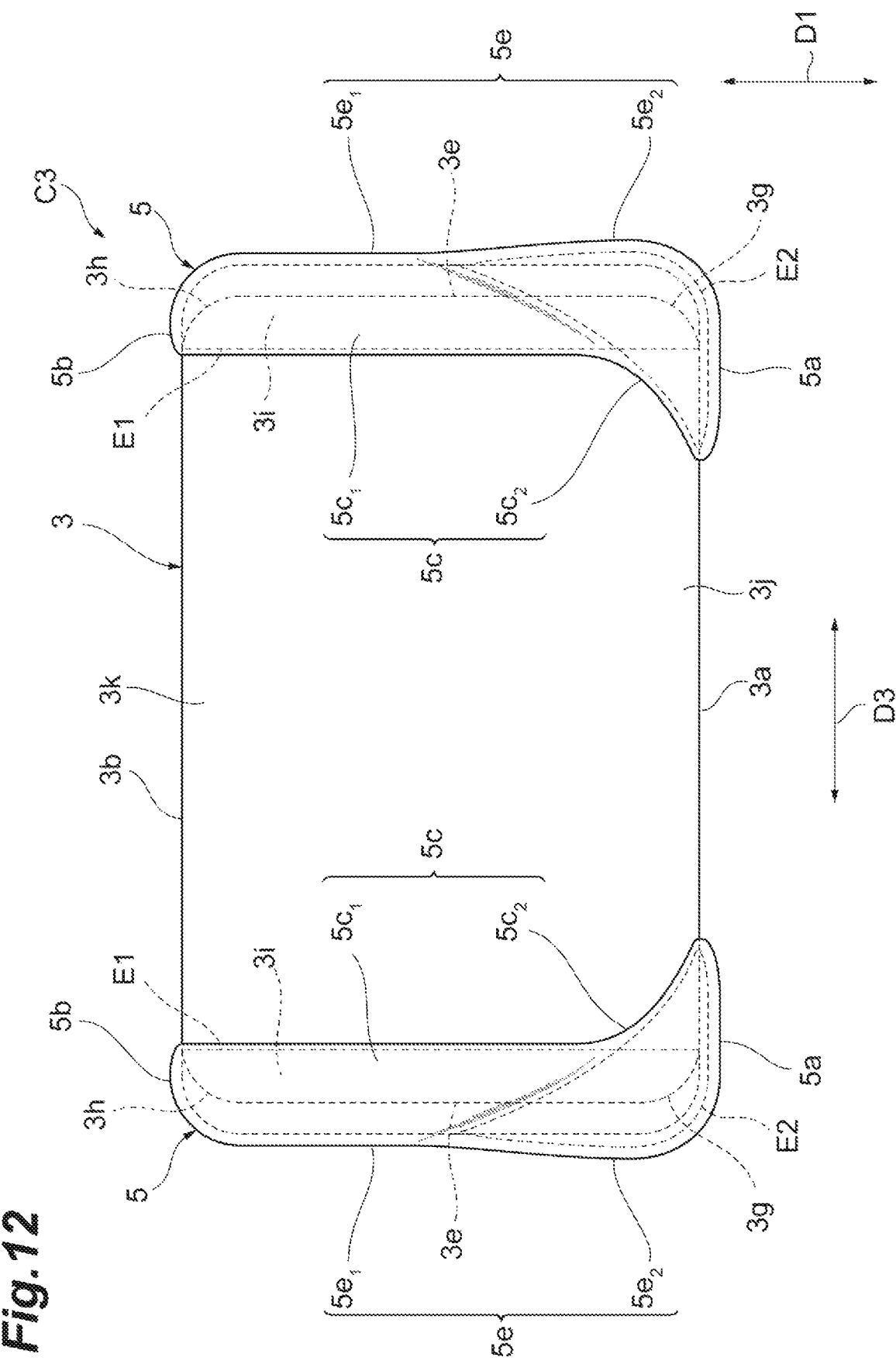
FIG. 12 is a side view of the multilayer capacitor according to the modification of the second embodiment.

Next, a configuration of a multilayer capacitor C3 according to a modification of the second embodiment will be described with reference to FIGS. 11 to 13. FIGS. 11 to 13 are side views of the multilayer capacitor according to the present modification.

The multilayer capacitor C3 includes, in the same manner as the multilayer capacitor C2, an element body 3, a plurality of external electrodes 5, a plurality of internal electrodes 7 (not illustrated), and a plurality of internal electrodes 9 (not illustrated). The multilayer capacitor C3 includes a pair of external electrodes 5. In the multilayer capacitor C3, a shape of a region $5c_2$ is different from that of the multilayer capacitor C2. Hereinafter, differences between the multilayer capacitor C2 and the multilayer capacitor C3 will be mainly described.

In the multilayer capacitor C3 illustrated in FIGS. 11 and 12, in the same manner as in the multilayer capacitor C2, a width of the region $5c_2$ in a third direction D3 decreases with an increase in distance from an electrode portion 5a. In the multilayer capacitor C3 illustrated in FIG. 11, an end edge of the region $5c_2$ is substantially linear when viewed from a second direction D2. The region $5c_2$ has a substantially triangular shape when viewed from the second direction D2. In the multilayer capacitor C3 illustrated in FIG. 12, the end edge of the region $5c_2$ has a substantially arc shape when viewed from the second direction D2.

In the multilayer capacitor C3 illustrated in FIG. 13, the width of the region $5c_2$ in the third direction D3 is substantially the same in the first direction D1. The end edge of the region $5c_2$ includes a side edge extending in the third direction D3 and a side edge extending in the first direction D1 when viewed from the second direction D2. In the present modification, the region $5c_2$ has a substantially rectangular shape when viewed from the second direction D2.

Although the embodiments and modifications of the present invention have been described above, the present invention is not necessarily limited to the embodiments and modifications, and the embodiment can be variously changed without departing from the scope of the invention.

The electronic component device ECD2 may include the multilayer capacitor C3 instead of the multilayer capacitor C2.

In the present embodiment, the electronic components are multilayer capacitors C1, C2 and C3. However, applicable electronic components are not limited to multilayer capacitors. The applicable electronic components include, for example, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component, comprising:
an element body of a rectangular parallelepiped shape including a pair of end surfaces opposing each other and a principal surface adjacent to the pair of end surfaces, the principal surface being arranged to constitute a mounting surface; and
the element body including two end portions opposing each other in a direction the pair of end surfaces oppose each other,
a plurality of external electrodes disposed at both end portions, wherein
the plurality of external electrodes includes a sintered metal layer and a conductive resin layer formed over the sintered metal layer and the element body, the conductive resin layer being in contact with the sintered metal layer and the element body,
the external electrodes include a first electrode portion disposed on one of the end surfaces,
the first electrode portion includes a first region in which the sintered metal layer is exposed from the conductive resin layer and a second region in which the sintered metal layer is covered with the conductive resin layer, the second region being located closer to the principal surface than the first region,
an average thickness of the conductive resin layer included in the first electrode portion is smaller than an average thickness of the sintered metal layer included in the first electrode portion,
the external electrodes further include a second electrode portion disposed on the principal surface and on a ridge portion located between the one of the end surfaces and the principal surface,
an average thickness of the conductive resin layer included in the first and second electrode portions is smaller than an average thickness of the sintered metal layer included in the first and second electrode portions,
the element body further includes a side surface adjacent to the pair of end surfaces and the principal surface, the external electrodes further include a third electrode portion disposed on the side surface and on a ridge portion located between the one of the end surfaces and the side surface,
an average thickness of the conductive resin layer included in the first and third electrode portions is smaller than an average thickness of the sintered metal layer included in the first and third electrode portions, and
the third electrode portion includes a third region in which the sintered metal layer is exposed from the conductive resin layer and a fourth region in which the sintered metal layer is covered with the conductive resin layer, the fourth region being located closer to the principal surface than the third region.

2. The electronic component according to claim 1, wherein a width of the fourth region in the direction in which the pair of end surfaces opposes each other decreases with an increase in distance from the second electrode portion.

3. The electronic component according to claim 1, wherein
the sintered metal layer is entirely covered with the conductive resin layer throughout the second electrode portion.

4. The electronic component according to claim 1, wherein the conductive resin layer is, at a first position of the element body, formed on the element body with the sintered metal layer therebetween and, at a second portion of the element body, formed on the element body without the sintered metal layer therebetween.

5. An electronic component, comprising:
an element body having an end surface, a principal surface adjacent to the end surface, and a side surface adjacent to the end surface and the principal surface, the principal surface being arranged to constitute a mounting surface; and
an external electrode disposed on the element body, wherein
the external electrode includes a sintered metal layer and a conductive resin layer formed over the sintered metal layer and the element body, the conductive resin layer being in contact with the sintered metal layer and the element body,
the external electrode includes a first electrode portion disposed on the end surface, a second electrode portion disposed on the principal surface and on a ridge portion located between the end surface and the principal surface, and a third electrode portion disposed on the side surface and on a ridge portion located between the end surface and the side surface,
the third electrode portion includes a region in which the sintered metal layer is exposed from the conductive resin layer and a region in which the sintered metal layer is covered with the conductive resin layer, and
an average thickness of the conductive resin layer is smaller than an average thickness of the sintered metal layer.

6. The electronic component according to claim 5, wherein the conductive resin layer is, at a first position of the element body, formed on the element body with the sintered metal layer therebetween and, at a second portion of the element body, formed on the element body without the sintered metal layer therebetween.

7. An electronic component, comprising:
an element body of a rectangular parallelepiped shape including a pair of end surfaces opposing each other, and a principal surface adjacent to the pair of end surfaces and arranged to constitute a mounting surface;
the element body including two end portions opposing each other in a direction the pair of end surfaces oppose each other,
and a plurality of external electrodes disposed at both end portions, the external electrodes including a first electrode portion disposed on one of the end surfaces, and a second electrode portion disposed on the principal surface and on a ridge portion located between the one of the end surfaces and the principal surface, wherein
the plurality of external electrodes includes a sintered metal layer and a conductive resin layer formed over the sintered metal layer and the element body, the sintered metal layer is entirely covered with the conductive resin layer throughout the second electrode portion, the first electrode portion includes a first region in which the sintered metal layer is exposed from the conductive resin layer and a second region in which the sintered metal layer is covered with the conductive resin layer, the second region being located closer to the principal surface than the first region, an average thickness of the conductive resin layer included in the first and second electrode portions is smaller than an average thickness of the sintered metal layer included in the first and second electrode portions, the element body further includes a side surface adjacent to the pair of end surfaces and the principal surface, the external electrodes further include a third electrode portion disposed on the side surface and on a ridge portion located between the one of the end surfaces and the side surface, an average thickness of the conductive resin layer included in the first and third electrode portions is smaller than an average thickness of the sintered metal layer included in the first and third electrode portions, and the third electrode portion includes a third region in which the sintered metal layer is exposed from the conductive resin layer and a fourth region in which the sintered metal layer is covered with the conductive resin layer, the fourth region being located closer to the principal surface than the third region.

8. The electronic component according to claim 7, wherein a width of the fourth region in the direction in which the pair of end surfaces opposes each other decreases with an increase in distance from the second electrode portion.

* * * * *